Patented Sept. 11, 1934

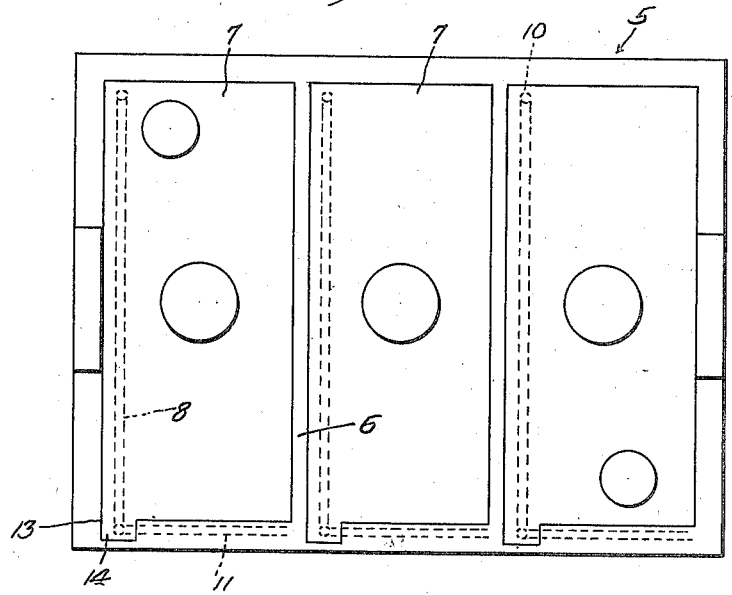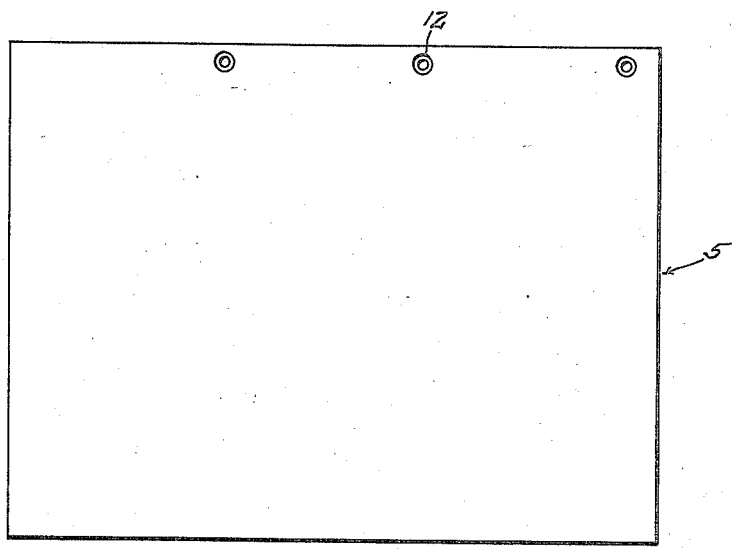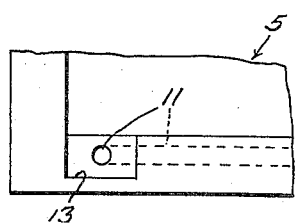

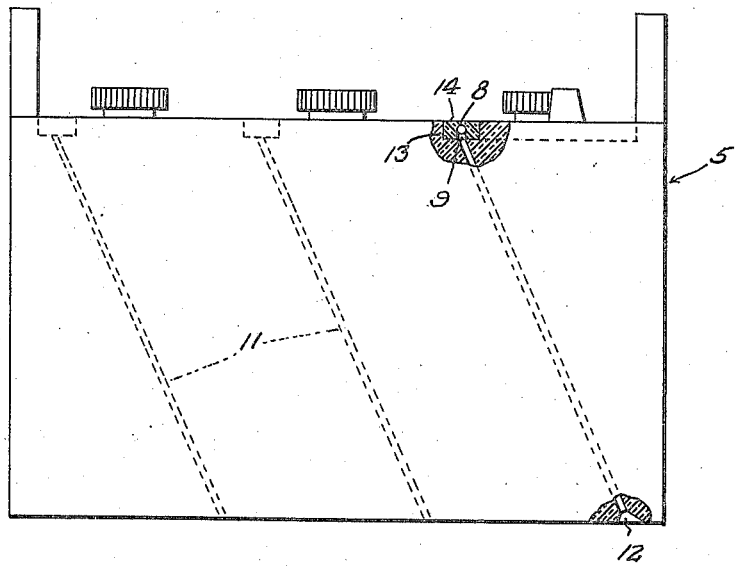
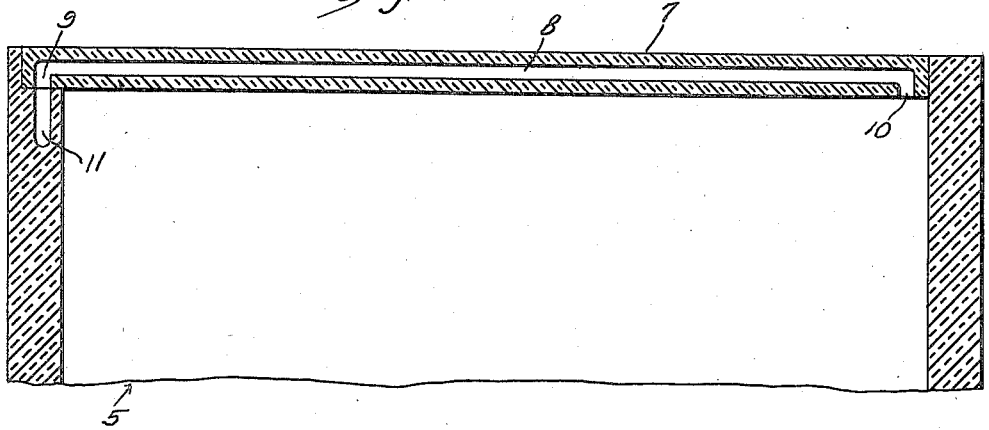
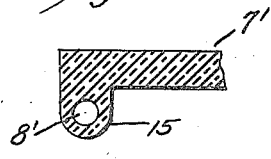

1,973,250

UNITED STATES PATENT OFFICE 1,973,250

STORAGE BATTERY

Lorraine E. Gum, Wheeler, Tex.

Application July 6, 1933, Serial No. 679,240

1 Claim. (Cl. 136—177)

This invention relates to storage batteries and more particularly to storage batteries of the type usually used on automobiles.

As is well known, very often, in the event of an accident to the automobile the electrolyte spills or leaks from the battery resulting in great damage and painful injury to the occupants of the automobile.

The object of the present invention is to provide a casing for the cells of the battery which will positively prevent the spilling of the electrolyte while at the same time permitting the escape of gas formed by electrolytic action within the battery casing.

Further it is an object of the present invention to provide improved vent means for permitting the escape of gas and at the same time prevent the electrolyte from running out of the vent opening when the storage battery is in any tilted position that it might assume under, for example, a circumstance above mentioned, namely accident to the automobile.

The invention together with its numerous objects and advantages will be best understood from a study of the following description taken in connection with the accompanying drawings wherein:

Figure 1 is a top plan view of a battery embodying the features of the present invention.

Figure 2 is a bottom plan view thereof.

Figure 3 is a top plan view of one corner portion of the battery casing with the cell cover removed.

Figure 4 is a side view of the battery with certain parts broken away and shown in section.

Figure 5 is a fragmentary transverse sectional view through the battery casing.

Figure 6 is a fragmentary sectional view of a slightly modified form of the invention.

Referring to the drawings by reference numerals it will be seen that 5 indicates generally the battery casing, the same being adapted to accommodate the cells of the battery which cells are separated by partitions 6 provided in the casing 5. Also, in accordance with the present invention each of the cells is provided with a removable cover or lid 7.

The battery box 5 as well as the lids 7 are made of the same material as is generally employed in the construction of the battery boxes now generally used with the possible exception in making, in the present instance, side walls of the box heavier or thicker than is usual in the ordinary construction.

As before stated the present invention is especially concerned with improved means for venting the battery in a manner to permit the gas to escape without a spilling or leaking of the electrolyte. To this end therefore each lid 7 adjacent one longitudinal edge thereof has formed therein a duct or passage 8 opening through the bottom or under side of the lid 7 at relatively opposite ends as at 9 and 10.

One side wall of the battery box 5, as shown, is provided with a plurality, in the present instance, three, ducts or passages 11, there being one such duct or passage 11 for each of the cells. As will be clear from a study of Figures 1 and 5 the ends 9 of the duct 8 in the lids 7 register or aline with the upper end of the diagonal passages 11. The passages 11 at their lower ends open at the bottom of the box 5, and at said end are flared as at 12, and in a manner clearly shown in Figure 4 for the purpose of guarding against the outlet end of the duct 11 becoming clogged with dirt or other foreign matter.

As shown in Figure 5 the end 10 of each of the ducts 8 opens into the battery box so that the gases formed by the electrolyte in the cell are permitted to escape through the passages or ducts 8 and the passages or ducts 11 to pass to the atmosphere through the ends 12 of the passages or ducts 11.

By such arrangement of ducts 8 and 11 ample provision is made for venting, or permitting of the escape of the gases without a leakage or spilling of the electrolyte should the battery be tilted or overturned.

To facilitate the placing of the proper end 9 of the passage 8 in alinement with the passage or duct 11 there is provided on that side wall of the box 5 equipped with the ducts 11 a notch 13 in the upper edge of said side wall for each of the cells. Each lid or cover 7 at the corner thereof where the duct 8 has its opening 9 located is provided with a projection 14 that fits within a recess 13. Thus it will be seen that the lid 7 can only be arranged properly in position and in a position that will insure an alinement of the end 9 of duct 8 with its proper passage 11 without requiring the attention of the operator to this important detail.

In the form of the invention shown in Figure 6 each lid 7' has its duct 8' formed in a depending integral projection or rib 15 provided at one longitudinal edge of the cover or lid. In this connection it may be stated that the wall or side of the battery box 5 equipped with the ducts 11 will be suitably modified in order to accommodate the type of lid shown in Figure 6.

While I have herein shown and described the preferred embodiment of the invention it is to be understood that it is in no wise intended to restrict the invention to the precise details of construction, combination and arrangement of elements as herein shown and described, other than may be necessary to meet the requirements of the prior art and scope of the appended claim.

Having thus described my invention, what I claim as new is:—

In a storage battery, a cell containing box, provided in one side wall with a notch in the upper edge of said side wall, and a diagonal vent duct extending from said notch to the bottom edge of said wall, and a cover for said box having at one end thereof a projection to engage in said notch, and a vent duct in said cover opening at one end remote from said projection, and at a relatively opposite end opening through said projection for communicating with the first named duct upon proper positioning of the cover upon said box.

LORRAINE E. GUM.